(12) United States Patent
Tirelli et al.

(10) Patent No.: US 9,394,656 B2
(45) Date of Patent: Jul. 19, 2016

(54) METHOD FOR PROTECTING TAUT CABLES FROM VIBRATIONS

(71) Applicant: THE EUROPEAN UNION, represented by THE EUROPEAN COMMISSION, Brussels (BE)

(72) Inventors: Daniel Tirelli, Taino (IT); Armelle Anthoine, Varese (IT)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 9 days.

(21) Appl. No.: 14/383,644

(22) PCT Filed: Mar. 8, 2013

(86) PCT No.: PCT/EP2013/054716
§ 371 (c)(1),
(2) Date: Sep. 8, 2014

(87) PCT Pub. No.: WO2013/132059
PCT Pub. Date: Sep. 12, 2013

(65) Prior Publication Data
US 2015/0014904 A1   Jan. 15, 2015

(30) Foreign Application Priority Data
Mar. 8, 2012   (EP) ..................... 12158673

(51) Int. Cl.
| F16F 15/00 | (2006.01) |
| E01D 19/16 | (2006.01) |
| F16F 1/02  | (2006.01) |
| F16F 15/04 | (2006.01) |

(52) U.S. Cl.
CPC . *E01D 19/16* (2013.01); *F16F 1/02* (2013.01); *F16F 15/04* (2013.01)

(58) Field of Classification Search
CPC ... F16F 15/00; F16F 15/04; F16F 2224/0258; H02G 7/14; E01D 19/16
USPC .................. 267/140.2, 140.11, 141, 182, 136
See application file for complete search history.

(56) References Cited

FOREIGN PATENT DOCUMENTS

| CN | 201526010    | 7/2010  |
| JP | 10037127     | 2/1998  |
| KR | 100934709 B1 | 12/2009 |

OTHER PUBLICATIONS

Korean Office Action issued Mar. 16, 2015 re: Korean Application No. 10-2014-7028337; citing: KR 10-0934709.
International Preliminary Report on Patentability for corresponding application PCT/EP2013/054716 filed Mar. 8, 2013; Mail date Mar. 3, 2014.

(Continued)

*Primary Examiner* — Robert A Siconolfi
*Assistant Examiner* — Vu Q Nguyen
(74) *Attorney, Agent, or Firm* — Cantor Colburn LLP

(57) ABSTRACT

A passive method for protecting taut cables from vibrations comprising the perpendicularly attachment of a device comprising a unilateral spring or a shape memory alloy wire to a taut cable at an attachment position wherein the device (especially the unilateral spring of the shape memory alloy wire of the device) acts on the taut cable only when the vibrating taut cable exceeds a switch position (SP); a device for protecting a taut cable from vibrations, as well as the use of such a device in a construction.

15 Claims, 10 Drawing Sheets

(56) References Cited

OTHER PUBLICATIONS

International Search Report for corresponding application PCT/EP2013/054716 filed Mar. 8, 2013; Mail date Apr. 17, 2013.
Dr. F. Weber, Dr. M. Hagmann: "A smart cable damping system for cable-stayed bridges" Feb. 26, 2007, EMPA, pp. 1-5, URL: http://www.empa.ch/plugin/template/empa/*/57646, XP 002681551.
S. Soltane, "Damping Stay Cable transverse Vibration Using Shapememory Alloys and Magneto Rheological Dampers", Proceedings of the Third Euro Mediteranean Symposium on Advances in Geomaterials ans Structures, Dec. 31, 2010, Retrieved from the Internet: URL: www-2.unipv.it/compmech/publications/2010_9p.pdf, XP002681553.
Tirelli D."Modal Analysis of Small and Medium Structures by Fast Impact Hammer Testing (FIHT) Method", EUR 24964 EN. Luxembourg (Luxembourg): Publications Office of the European Union; Jul. 22, 2011. JRC66055., XP002681552.

METHOD FOR PROTECTING TAUT CABLES FROM VIBRATIONS

TECHNICAL FIELD

The present invention generally relates to methods allowing protecting taut cables from vibrations which may be caused by wind, rain, earthquakes or traffic. The present invention also concerns devices which are useful for protecting taut cables from vibrations.

BACKGROUND ART

Bridge cables submitted to wind, rain, traffic and (more rarely) to earthquakes exhibit important motions sometime in correspondence of the deck oscillations. The resonance phenomena are responsible of these dangerous motions which conduct to fatigue damages and in the worst cases to cable rupture or bridge collapse in extreme situations. The resonance phenomena may be defined as "every particle is in synchronous harmonic motion with the same frequency". The resonance is the tendency of a system to oscillate at greater amplitude at some frequencies than others. The resonance occurs when the input energy focuses mainly on one mode of vibration of the structure which means at one particular value of period of oscillation. After each new period of time the input energy is summed to the previous one. This summation conducts to reach high level of vibrations called resonance. Thus, the vibrations of the cables may have very deleterious consequences for the bridge. In view of this, several solutions have been considered and proposed for reducing or preventing (excessive) vibrations of cables.

Most of the solutions provided are based on the same concept, which is generally called damping. The damping corresponds to any effect that tends to reduce the amplitude of oscillations in an oscillatory system, acting on the consequences of the resonance phenomena but not on the causes. The damping may be explained in term of energy. The input energy (such as vibrations caused by wind, rain, earthquakes or traffic) causes structural motions (vibrations), which can be measured by the kinetic energy of the structure. By connecting some devices, called dampers, to the cables, a part of the kinetic energy will be degraded to heat inside these devices by different mechanisms. A damper is a device that deadens, restrains or depresses the vibrations of the cable. In this way, energy is removed from the main structure to the damper where viscous fluid, or visco-elastic materials, or magneto-rheological or hysteretic materials, converts the energy. With the damping method, the shape of the dynamic motion is unchanged but the amplitude of the modes is reduced by the damping effected by the devices. Most of the dampers used are passive devices, due to their practical application, their reduced cost and their robustness. In the case of cables, the dampers are inserted most often close from anchorage of the cables. This technique is rather simple but the efficiency due to their position on the cable is limited. The maximum damping increment factor is about 2 and for a few modes only. Another inconvenient is in some cases the aging of the dampers, as the material or liquid used is continuously working. Due to this problem, dampers must be replaced more than once in the structure's life when they become less efficient. Sometime, they are also invasive on the design of the bridge as they have generally important dimensions due to the forces they are submitted to near the anchorages.

In view of this, novel passive systems which also use the same damping process have been developed. Said novel passive systems involve the use of Shape Memory Alloy (SMA) materials, which are wires, made generally of Nickel, and Titanium. The interest with respect to the classical devices is essentially their minimum clutter. In these systems the damping comes from the hysteric behavior of Shape Memory Alloy material.

Furthermore, in the last decade, most of the passive solutions were improved drastically by introducing an active or a semi-active control of the dampers using different procedures and algorithms. These techniques brought different improvements in vibrations damping. However, the active and semi-active controls of the dampers are not easy to implement. In addition, they require an electrical power supply and electronic supports. Consequently, frequent maintenance is necessary and costs are increased which lets the bridge builder to still prefer passive solutions and to use the active and semi-active controls of the dampers for exceptional structures only.

Another type of solution named Tuned Mass Damper (TMD) could be used in some cases when the structure is submitted permanently to a given force which corresponds to one of the natural frequencies of the structure. By connecting a small mass via a spring to the structure it is possible to counteract a part of the structural motion by the small mass moving in opposition phase. In this way, a part of the energy is transferred to the new degree of freedom added to the structure. Two new modes appear instead of one, with smaller amplitudes, and generally a damper is associated to the mass added, to limit its motion. Thus, the mechanism generally involves a damper, which is associated to the mass added for limiting its motion. This mechanism is generally not applied on cables as the excitation spectra, most often large band, could excite one of the new modes created. These devices are applied more often on the bridges themselves under the deck when a particular frequency is expected. However, the drawbacks of theses devices relate to the added weight and to their location.

One further specific system used for cables is the cross tie tendons, which is made most often of steel rods or tendons connecting several cables together. The effect is to reduce drastically the vibrations amplitude of each single cable. The inconvenient are the new local modes between the ties, and the design of the cross ties which is not always easy to optimize. A further inconvenient is the aesthetic of the solution with respect the bridge design as the cross-ties work only if they are at the antinodes of the cable vibrations and therefore distant from the anchorages. Thus, this kind of device is visible and affects the design of the bridge.

As a result, there still is a need to develop a new method for protecting taut cables that efficiently neutralizes the vibrations, which does not require significant maintenance, and which does not involve the use of a device which is aesthetically too invasive.

GENERAL DESCRIPTION OF THE INVENTION

It is an aspect of the present invention to provide a passive method for protecting taut cables from vibrations introducing a new concept of vibrations reduction based on the causes of the growth of resonance in cables. Said passive method comprises the perpendicular attachment of a device comprising a unilateral spring or a shape memory alloys wire to a taut cable at an attachment position (or anchorage position) characterized in that the device acts on the taut cable (or the attachment to the taut cable occurs) only when the vibrating (moving) taut cable exceeds a switch position (SP) which is determined by the following equation (1):

$$SP(A\text{opt}) = A\text{opt}(1 - 2/(1 + R_k))$$

wherein:

Aopt is the amplitude reached by the taut cable with the device optimized at SPopt, $R_k$ the dynamic stiffness ratio between the taut cable with the device ($K_{ssi}$) and the taut cable without the unilateral spring ($K_{cable}$).

The dynamic stiffness ratio $R_k$ can be calculated by on-site measuring of the resonant frequency of the cable alone $f_{c(i)}$ and the frequency $f_{(c+s)(i)}$ of the cable connected permanently, $R_k$ can be defined by equation (2):

$$R_k = \left(\frac{f_{(c+s)(i)}}{f_{(c)(i)}}\right)^2$$

If this experimental method cannot be performed (for whatever reason), the SP may alternatively be approximated by another specific equation using a Galerkin approach. In this case, $R_k$ is defined by the following equation (3):

$$R_k = 1 + \frac{k_s \cdot \sin(i.\pi.ap/L)^2}{k_{(c)(i)}}$$

With $1.1 < R_k < 1.4$, which corresponds to the suitable stiffness increment to obtain a safe but efficient mitigation, $K_s$ is the stiffness of the unilateral spring or the stiffness of the Shape Memory alloy wire (for example a Nitinol wire) in the austenite phase (elastic phase), i corresponds to the resonant mode number, L is the cable length and ap is the attachment (or anchorage) position of the device.

As a result, the equation of the SP is now connected to the anchorage position (or attachment position) (ap) by substituting $R_k$ with equation (3) in equation (1), equation (4):

$$SP(Aopt) = A(\text{opt})\left[1 - \left(\frac{2}{2 + \frac{k_s \cdot \sin(i.\pi.ap/L)^2}{k_{(c)(i)}}}\right)\right]$$

Generally the cable designer provides the values of the cable length L, cable stiffness $k_{(c)(i)}$ for the mode i to be mitigated, and the maximum distance of the device anchorage (ap) for an easier installation. If $k_s$ is already defined by the spring stiffness (or SMA wire as Nitinol) available, to obtain accurately the value of SP it is preferable to take the maximum distance (ap) authorized by the designer and to choose between the set of springs available to obtain a coefficient $R_k \sim 1.4$. The limits of the optimal switch position with respect the amplitude optimal could be written substituting $R_k$ in equation (4) by 1.1 (min. limit) and 1.4 (max. limit), equation (5):

$$0.05 * Aopt < SP(Aopt) < 0.17 * Aopt$$

From this result, it can be noted that the SP will be less than 17% of the maximal amplitude of vibration of the cable at the anchorage (or attachment) position ap. It is always a small value not far from zero and therefore accuracy is needed for the adjustment. For this reason the experimental method explained above is generally preferable.

As a result, the SP may be determined by two distinct ways, namely by using either:

equations (1) and (2) if $R_k$ may be determined by the experimental method, or equations (3) and (4), taking $A_{opt} \sim A_{max}/3$ as the amplitude reduction factor is around 3 times with respect the cable alone. And $A_{max}$ is the value of the maximal amplitude of the oscillations of the cable in anchorage (or attachment) position (ap), measured or calculated, given by the cable designer or by the responsible of the cable monitoring.

The method according to the present invention involves the perpendicular attachment to a taut cable and non-permanent (occasional) action of a device on this taut cable. It means that the device does not permanently act on the taut cable. In other words, the device only sporadically acts on the taut cable. However, the perpendicular attachment of the device to the taut cable is permanent whereas the action of the device, especially the action of the unilateral spring or the shape memory alloy wire is non permanent (or sporadic or occasional). Known methods use devices which permanently act to the main structure. Contrary to the known methods for protecting taut cables from vibrations, the present method does not require the permanent action (or attachment) of the device to the taut cable. The device, which may include a unilateral spring or wire of shape memory alloy, is connected to the cable when the cable starts to excessively move due to external excitation. Indeed, the unilateral spring or the shape memory alloy wire of the device only works on the taut cable when the taut cable reaches a position beyond the switch position. As the cable motion is pseudo-periodic during all the time of oscillations, it will act (or be connected) and stop to act (or be disconnected) automatically each time it crosses the SP. This specific feature confers to the system to change alternatively the dynamic properties of the main cable and thus to become a unique concept of vibration mitigation.

In fact, the switch position of the taut cable corresponds to a predetermined position of the taut cable which would eventually be reached during a motion of the taut cable caused by increasing vibrations. In other words, the device only acts on the taut cable when the taut cable is submitted to vibrations causing the motion of the taut cable beyond (or above) the switch position (SP).

The known methods for protecting taut cable from vibrations are all based on the same concept: transfer of energy from the taut cable to other cables (case of cross-ties) or to devices (case of TMD and dampers). In fact, the known methods involve the permanent action (or attachment) of the device to the taut cable and a part of the vibration energy is removed from the structure to the device (damper, TMD or cross ties). For example, in the conventional dampers, a part of the energy is removed from the structure to the damper. In a TMD, this part is going in the added device which is the oscillated mass with its small damper. In a crosstie a part of energy is transferred to the other cables by the crosstie attachment. The resulting motion remains a sinusoidal or a combination of sinusoidal motions.

The method according to the present invention involves the periodical action (or attachment) of the device on the taut cable. In the context of the present invention, the expression "periodical action (or attachment)" refers to the actions of the device on the taut cable when the taut cable reaches the Switch Position. In fact, by doing so, the device does not remove energy from the structure but induces to change its dynamic signature. All known methods remove energy from the main structure to the one added (TMD or cross ties) or to the device itself (dampers). The method according to the present invention only involves a unilateral spring or a SMA wire and the energy remains in the main cable. The motion of the cable is no longer governed by a particular resonance but distributed in many of them which conducts to a reduction of the global maximum amplitude reached by the cable. Furthermore, since a spring is not a dissipative element, no energy is converted therein. When a spring is inserted in a system, it is not possible to degrade more energy than the original structure does. As a result, a new concept of mitigation of cable vibrations has been developed.

Another aspect of the invention is a device for protecting taut cable from vibrations comprising a unilateral spring comprising shape memory alloy which is perpendicularly attached to a taut cable and which non-permanently (or occasionally) acts on (or is non-permanently attached to) said taut cable. Notably, said device shows the advantage to have a reduced clutter. "Perpendicularly attached to a taut cable" means that the device is connected to the taut cable with an angle of about 90 degrees (e.g. +/−10 degrees, preferably not more than +/−5 degrees). In others words, the angle formed by the intersection of the taut cable and the device is about 90 degrees. "Non-permanently (or occasionally) acts on the taut cable" means that the device according to the present invention acts on the taut cable only when the taut cable reaches, exceeds or crosses the Switch position.

Another aspect of the present invention relates to the use of the device according to the present invention for protecting taut cable from vibrations, especially in constructions such as bridges.

DESCRIPTION OF PREFERRED EMBODIMENTS

Figure 1:
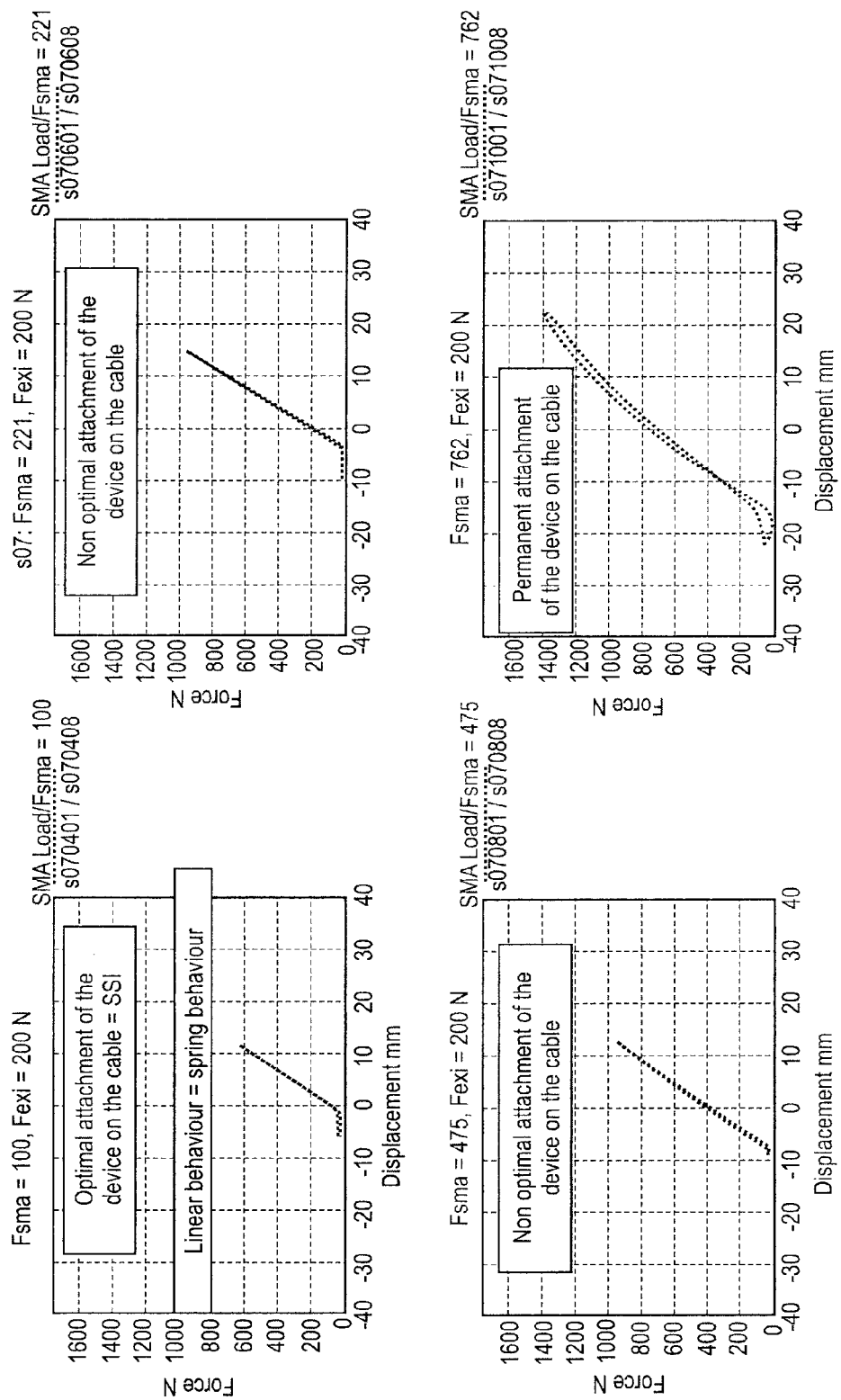
FIG. 1: shows four diagrams corresponding to the behaviour of the spring (in that case a shape memory alloy wire namely Nitinol wire) attached to the same cable and for 4 tensions which correspond to 4 switch positions.

As already mentioned, an aspect of the present invention is a passive method for protecting taut cables from vibrations comprising the perpendicularly attachment of a device comprising a unilateral spring or a shape memory alloys wire to a taut cable at an attachment position (or anchorage position) characterized in that the action (or attachment) of the device (especially the action of the unilateral spring of the shape memory alloy wire) on the taut cable occurs only when the taut cable exceeds the switch position (SP) which is determined by the previously mentioned equation (1).

Practically, if $R_k$ is a function of ($K_{cable}$, $K_{ssi}$, ap) which are defined before the insertion of the device, ap referring to the attachment position or anchorage position of the device to the taut cable, then the optimal $SP_{opt}$ may be found by applying the previously mentioned equation (1) when $A=A_{opt}$ Even if $A_{opt}$ is unknown, it may be approximated and also $SP_{opt}$ by applying the three following tests:

1st step: The first test consists in determining the input (Im) corresponding to the maximal amplitude expected on the free cable.

2nd step: The second test consists in applying the previously defined Im to the taut cable for a SP equal to zero in order to obtain an amplitude $A_0$ close to $A_{opt}$ since the stiffness difference is small. The value of $SP(A_0)$ is slightly greater than SP optimal. It has to be noted that if the stiffnesses are equal, thus SP=0 since the system is a linear system.

$3^{rd}$ step: In order to approach very accurately the $SP_{opt}$, a third step should be performed while moving the SP from zero to $SP(A_0)$ as calculated by applying the above-mentioned equation. Then, the taut cable has to be excited with the input Im in order to obtain the value of the maximum displacement $A_{opt}$. As a result, the new value of SP which is very close from the $SP_{opt}$ is calculated with the above-mentioned equation.

The method according to the present involves the perpendicular attachment and the non-permanent (or occasional) action of the device on the taut cable. In fact, the device acts on (or is attached to) the taut cable when the taut cable is submitted to external actions such as wind, rain, traffic or earthquake, which induce vibrations and resonances throughout the taut cable. To be efficient in motion reduction and as resonances cause periodic or pseudo periodic motion, the device must act on the taut cable only when the taut cable exceeds a predetermined position named switch position (SP, generally close to the static position of the cable). In this way, the device is active only during a part of the period of vibration of the original taut cable.

The method according to the present invention involves the occasional action of the device on the taut cable. It means that the device does not permanently act on the taut cable. In fact, the device thereby only sporadically acts on the taut cable when needed. It is this alternative action which is responsible of the drastic change of the dynamic signature of the structure. Furthermore, since the device according to the present invention is not a dissipative device (but only a spring or SMA wire), no energy is extracted from the taut cable. Thus, the structural motion becomes more complicated.

In fact, two distinct effects of motion reduction of the present method have been observed.

The first effect of motion reduction is that the linear behaviour of the taut cable is transformed in Bilinear Oscillator behaviour. It means that a taut cable equipped with a device according to the present invention does not act as a linear system, but rather as a bilinear oscillator system. Indeed, the taut cable is forced to change its dynamic characteristics at a given periodic time or position, namely the switch position. Thus, the taut cable is induced to change periodically the set of values of its natural frequency.

In fact, contrary to the known methods presented above, no energy is extracted from the taut cable. The kinetic energy remains in the taut cable.

Starting from the rest position of the cable and of the spring or the SMA wire, when the cable is going up due to vibrations, it moves the spring and one part (small) of the energy of the cable is transferred in kinetic energy of the spring or SMA wire. When the cable goes back from the maximum upper position, the potential elastic energy ($k_s x^2/2$) stored in the spring or SMA wire elongated, will be given back to the cable by mean of the force that this one exerts on the cable. The kinetic energy extracted from the cable is totally refunded to the cable in elastic energy as it is shown in FIG. 1 upper left (straight line). The balance is zero which means that no energy is stored by the device.

Since the method according to the present invention transforms the linear behaviour of the original taut cable in Bilinear Oscillator behaviour, the half periods of oscillations become asymmetric with respect to the zero axes of amplitudes. The main property of the Bilinear Oscillator of one degree of freedom (DoF) is that excited at its own resonance its response is a multi degree of freedom (multi DoF) motion. In other words, a Bilinear Oscillator is able to redistribute the energy in super and sub harmonics of the structure. The modes of vibration of a taut cable are modified by the method according to the present invention. Furthermore, an approximated duplication of the excited number of modes can be observed. As a result, the present method applies a continuous change of the modes of vibrations in such a way that the resonance motion is not unique but distributed in several smaller motions. Thus, as each mode of vibrations captures a part of the total input energy (caused by wind, rain, traffic or earthquake), if the energy is distributed in a greater number of modes, each one will exhibit smaller motions and the resonance phenomena will be mitigated.

The second effect of the method according to the present invention is using the modal coupling effect. This effect observable during the decay period of vibrations as it results in increasing the damping effect and therefore shorten the time of oscillations. In fact, taut cables are often submitted to alternative input forces as wind, rain, earthquake or traffic which give forced period of several seconds, followed by periods (longer generally) of decay of the oscillation. During these periods, it is interesting to have a larger damping to shorten the time of oscillations. However, in the case of the method according to the present invention, it is not possible since only elastic elements are implemented. Nevertheless, since the switch position is well designed and since we are in condition of beating, it is possible to use the counteraction of the internal resonances. It conducts to decrease drastically the signal under amplitude for which it remains in a pure one state and thus without beating. The signal will not increase again as it is on normal beating phenomena. In such a way, an important effect of damping has been added to the structure at least for the large amplitudes.

According to one embodiment of the present invention, the attachment position (ap) (or anchorage position) of the device to the taut cable is comprised within the range of 0.05 xL and 0.25 xL, wherein L represents the taut cable's length. In particular, the attachment position of the device to the taut cable is comprised within the range of 0.10 xL and 0.20 xL. In a preferred aspect of the invention, the attachment position (ap) of the device to the taut cable is about 0.15 xL.

Furthermore, it may be appreciated that the attachment position of the device to the taut cable is not located at node positions of the main modes of vibrations. Cables oscillate in the two directions (In-plane and Out-of-plane). Using a classical mitigation system (Damper, TMD etc.), the plane of attachment of the device is essential because it will affect rather the modes in which they are mounted. In fact, dampers are generally inserted in couples with an angle as large as possible to be near 90 degree to be efficient in both directions. The device according to the present invention has the particularity that it works in changing the stiffness of the cable in the vertical direction because the device is installed between the cable and the deck. However, due to the symmetry of the cable section, oscillations are always present in both directions in-plane and out of plane, with larger amplitude in the input force direction. As the vibrations mitigation effect depend of the stiffness switching and of the amplitude, it will be present in the horizontal direction only for high amplitude because it is only the component out of axe of the spring which changes weakly the horizontal stiffness. According to one embodiment, the device is attached to the taut cable in the plane of the vibrations to be mitigated.

According to a specific embodiment of the present invention, the method involves the use of a device including a shape memory alloy (SMA) wire. In particular, the shape memory alloys may be a metal alloy of Nickel and Titanium. Indeed, shape memory alloys are binary alloys, most frequently composed by an association of Nickel and Titanium. An example of this kind of shape memory alloys is Nitinol. SMAs change their crystalline arrangement as they are cooled down or heated up, as well as in the presence of a stress field. The crystalline geometry is for example ordered cubic, but after phase transformation from austenite to martensite the crystal, under stress, bends. The result is a large elastic deformation of the sample with reversibility when returning in the austenite phase. This property of no-degrading the crystal structure when the alloy is under stress is the so-called super-elastic behaviour of the material. In addition, the path followed by the material in the theoretical stress-strain curve shows a flat level of stress in the loading phase, whereas another plateau appears at a lower stress level during the unloading phase. The difference between the two levels of stress multiplied by the corresponding strain gives the energy absorbed in the hysteresis loop by the Shape Memory Alloys. Thus, the shape memory alloy is an alloy that "remembers" its original, cold-forged shape: returning the pre-deformed shape by heating. Furthermore, this material is a lightweight, solid-state alternative to conventional actuators such as hydraulic, pneumatic, and motor-based systems. Another advantage of shape memory alloys is that they can be provided as a spring and a damper together in a simple wire. The spring is due to the super-elasticity of the material and the damper to the hysteretic cycle exhibited by the material under large strain. In fact, when the SMA, for example Nitinol, is submitted to strong motions, it acts like a damper whereas when it is submitted to weak motions, it acts as a spring.

According to an aspect of the present invention, Nickel and Titanium are present in equal atomic percentages in the metal alloys.

Although the diameter of the wire can be chosen within a wider range, the diameter of the wire of Nitinol is preferably comprised between 1 and 3 millimeters, more preferably between 1 and 2 millimeters. The main reasons to use a thin wire of SMA are:

- the role of the device according to the present invention is to change the dynamic stiffness of a small amount to be sure that the harmonic created by the bilinear oscillator will excite the other modes of the cable,
- if the wire is too stiff, it will introduce a strong bi-linearity in the behaviour which can conduct to excite too much higher modes which is not suitable for the anchorage fatigue,
- to obtain the modal coupling frequencies, difference or stiffness difference with and without SMA wire must be small,
- the hysteretic behaviour is highly dependent of the wire diameter for dynamic motion, the smaller the wire diameter is, the larger is the hysteretic cycle, and the higher will be the damping effect for exceptional amplitude.

It is possible to use a device made of several wires of SMA, if a larger damping effect is to be obtained for exceptional loads. Furthermore, it is advantageous that the SMA wire may be that thin, as this contributes to the aesthetics of the construction, because it is not too invasive on the design of the bridge.

The present invention also refers to the device necessary for implementing the method for protecting the taut cables from the vibrations. Said device comprises a unilateral spring comprising shape memory alloys, which device is perpendicularly attached to a taut cable and which periodically (or occasionally) acts on said taut cable. "Periodically (or occasionally) acts" means that the taut cable does not permanently acts on the taut cable, namely only when the taut cable reaches (or exceeds or crosses) the Switch Position (SP).

The present device allows slightly changing (10% to 40%) the dynamic stiffness of the cable alternatively. The formula for determining the attachment position of the device according to the present invention may be differentiated into two main cases, namely: the use of a classical spring and the use of a SMA wire (such as Nitinol).

Case 1: The Device According to the Present Invention Comprises a Unilateral Spring.

In this case, the spring stiffness is not dependent of the distance (ap).

The limits of the stiffness ratio is defined by the following formula:

The lower limit (1.1) is defined to obtain a minimum efficiency of the device to reduce roughly twice the amplitude motion with respect to a free cable (to be efficient at least as a damper).

The upper limit (1.4) is a value obtained on the cable experimented in ELSA (European Laboratory for Structural Assessment), to maintain the same maximum designed curvature at the anchorage, taking account of the modal distribution modification when the device is attached to the cable. The upper limit is therefore a recommendation which could be modified by the cable designer, to maintain low dynamic stress at the anchorage. In that sense, it is not a mathematical value, but a safety coefficient.

$$1.1 \leq 1 + \frac{k_s \cdot \sin(i.\pi.ap/L)^2}{k_{(c)(i)}} \leq 1.4 \qquad \text{Equation (6)}$$

If the spring stiffness $k_s$ is given (by the constructor), and if the cable stiffness $k_c$ and the cable length L is already defined by the bridge designer, the device can be attached at a position (ap) inside the following limits:

$$\left(\frac{L}{\pi.i}\right) * \text{Arcsin}\left(0.32 \cdot \sqrt{\frac{k_{(c)(i)}}{k_s}}\right) \leq \qquad \text{Equation (7)}$$

$$ap \leq \left(\frac{L}{\pi.i}\right) * \text{Arcsin}\left(0.63 \cdot \sqrt{\frac{k_{(c)(i)}}{k_s}}\right)$$

EXAMPLE

Cable length=L=45 m

Cable stiffness measured for the mode no: 1=(c)(1) k=35.6 KNm (where the cable tension: T=250 KN)

Spring stiffness (SMA elastic for a length of 4.2 m and dia. of 2.5 mm) measured with all the mechanical system of measurement and anchorage=40 KN.

We obtain the following limits of the attachment (or anchorage) position to install the device:

4.4 m≤ap≤9.1 m

The adopted position to inserted the device in this experiment was of 8.2 meters.

Case 2: The Device Comprises a SMA Wire.

Figure 16:
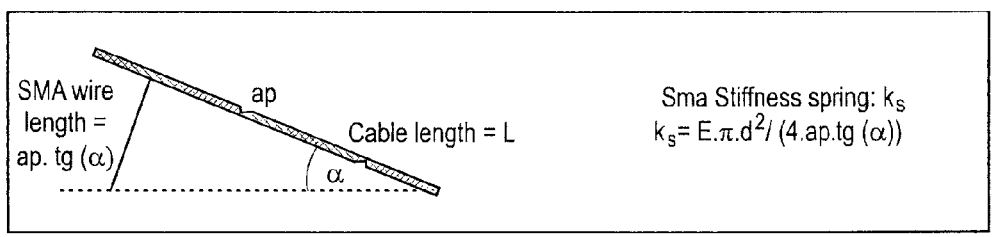
FIG. 16: shows the relation between cable and wire spring (see equation (8) below, d is the diameter of the wire).

In that case, it is highly recommended to test different positions of attachment (ap) on the cable to obtain an approximate solution. Indeed, this case is more complicated since the stiffness of the SMA wire is dependent of (ap). In addition, the wire is mounted perpendicular to the cable and the length of the wire cannot be longer than the distance between the cable attachment and the deck of the bridge as it is shown in the scheme in FIG. 16 which shows the relation between cable and wire spring.

$$\frac{(0.1).4.tg(\alpha).k_{(c)(i)}}{\pi.E.d_s^2} \leq \frac{\sin(i.\pi.ap./L)}{\sqrt{ap}} \leq \frac{(0.4).4.tg(\alpha).k_{(c)(i)}}{\pi.E.d_s^2} \qquad \text{Equation (8)}$$

Which becomes a transcendent inequality for which the solution could be calculated only numerically and dependent of the following parameters given by the designer:

i=mode number to mitigate, cable stiffness k(c)(i), angle of cable inclination tg(α), diameter of the SMA wire ds.

$$3.56*10^{-9} \cdot \frac{tg(\alpha).k_{(c)(i)}}{.d_s^2} \leq \qquad \text{Equation (9)}$$

$$\frac{\sin(i.\pi.ap./L)}{\sqrt{ap}} \leq 14.2*10^{-9} \cdot \frac{tg(\alpha).k_{(c)(i)}}{.d_s^2}$$

According to one aspect of the present invention, the device may comprise two stirrups which are connected to each extremity of the unilateral spring, the first one is the inferior stirrup that is connected to the deck of the bridge or to the ground, and the second one is the superior stirrup that is connected to the taut cable.

In particular, the superior stirrup is connected to the taut cable trough a rigid fixation device. A rigid fixation between the base of the cable and the upper extremity of the device is sufficient and allows a simpler device design. The term "rigid fixation" refers to a fixation showing a stiffness at least greater than fifty times the transversal stiffness of the cable at the anchorage (or attachment) position (ap).

Figure 2:
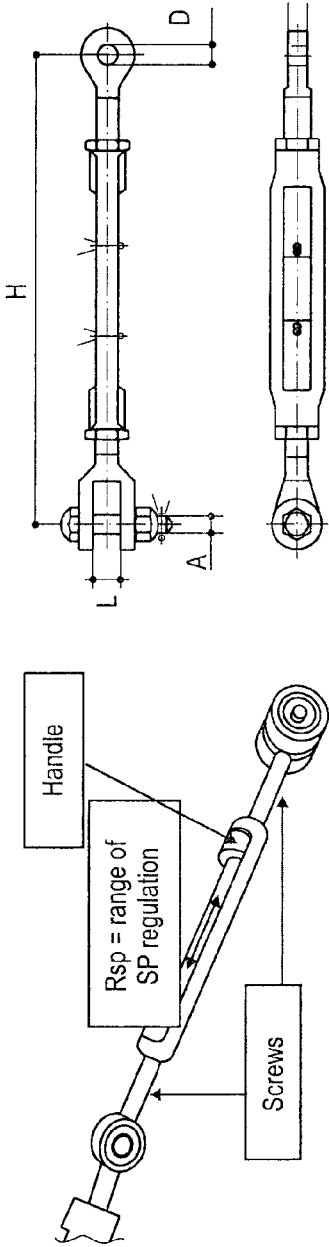
FIG. 2: shows a screw arrangement that can be used in the present invention.

The device may include a screw arrangement for gap regulation. The term "gap regulation" means that it is possible to optimise the device regulating the gap or the small tension of the spring when the cable is at rest. For example, a screw arrangement as shown at FIG. 2. By turning the handle, the upper and lower screws come in or out, giving to the wire of the spring, the required tension or gap necessary to obtain the optimal switch to be efficient at the maximal amplitude expected. The screws and the handle constitute the drawing for the regulation. However, other kind of screw arrangements or drawings allowing obtaining the same effect can be used in the device according to the present invention. They must preferably be stiff enough to not add any supplementary strain to the device according to the present invention.

The device is connected to the ground or to the deck of the bridge through the screw for gap regulation.

According to one aspect to the invention, the present device may comprise: a rigid fixation device, connected to a stirrup linked to one of the extremity of the unilateral spring, the other extremity of the unilateral spring being connected to another stirrup linked to the ground or to the construction (such as the deck of the bridge) optionally through a screw arrangement for the gap regulation.

The unilateral spring or the SMA wire(s) is an elastic device which recovers its shape after having been contracted or stretched. According to one embodiment, the SMA is Nitinol.

According to one embodiment, the diameter of the wire of Nitinol may be comprised between 1 and 3 millimeters, preferably 1 and 2 mm.

The device may optionally further comprise a load cell. The load cell is a transducer which converts force into a measurable electrical output. This conversion is indirect and happens in two stages. The force sensed deforms a strain gauge through a mechanical arrangement. The strain gauge measures the deformation (strain) as an electrical signal, because the strain changes the effective electrical resistance of the wire. In this case, the load cell is connected between the one extremity of the unilateral spring and the inferior stirrup.

In a preferred way, the device comprises a SMA wire comprising Shape Memory alloys which a metal alloys of Titanium and Nickel. In a preferred way, Nickel and Titanium are present in equal atomic percentages in the metal alloys.

An advantage of this material is that it can be modeled as a spring and a damper together in a simple wire. The spring is due to the super-elasticity of the material and the damper to the hysteretic cycle exhibited by the material under large strain.

The present invention also refers to the use of the device for protecting the taut cable from the vibrations. In particular, the present invention refers to the use of the device for protecting the taut cable from the vibrations caused by wind, rain, traffic or earthquake.

All the embodiments previously mentioned may be individually implemented or may be combined within reason.

Experimental Tests

Figure 3:
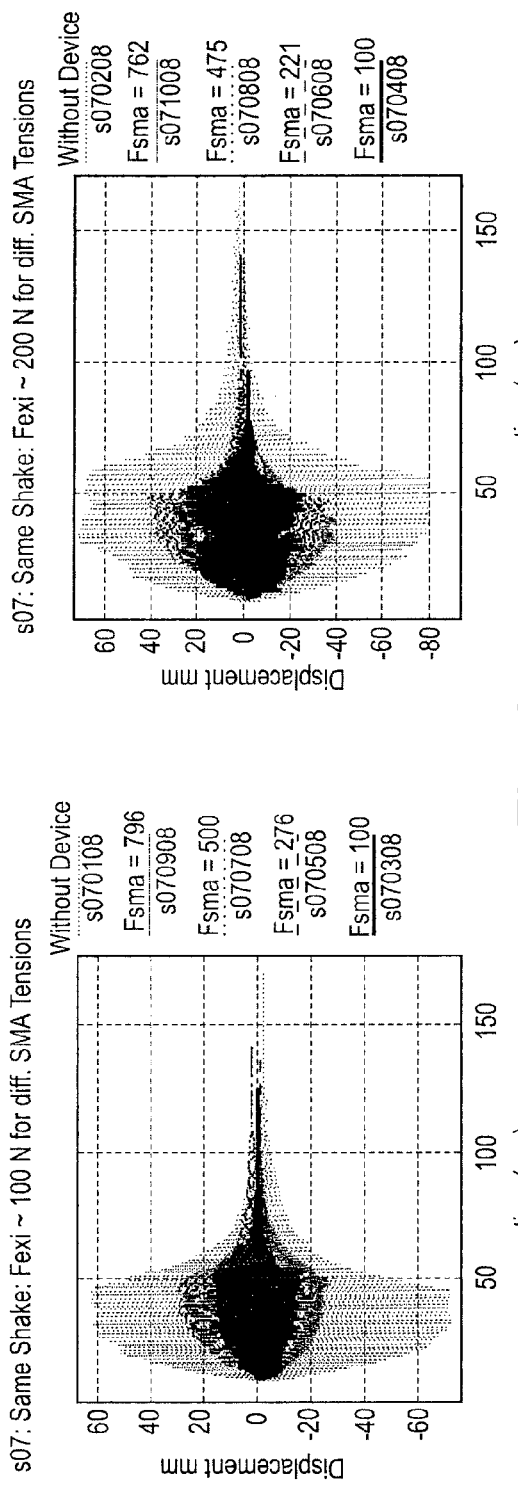
FIG. 3: shows the experimental motion of a cable equipped with the device according to the present invention for four switch positions corresponding to FIG. 1 and a free cable which is not equipped with a device according to the present invention.

During external excitations a device according to the present invention designed with optimal characteristics and inserted on a given position on a cable is able to decrease the vibration motion of a factor 3 compared with the same free cable (i.e.: the cable without device) and of a factor of 2 for a cable with an equivalent linear stiffness. Experimental results (see FIG. 3) show the reduction of motion between a free cable (the curve of largest amplitude identified as "without device" on the graph, namely the first one identified within the legend) and a cable equipped with the device according the present invention of dynamic stiffness ratio Rk=1.29 and for different switch positions (or SMA tension at rest). The motion illustrated by the "Fsma=100" curve of smaller amplitude (the bold curve on the graph, namely the last one identified within the legend) corresponds to the optimal Switch Position for an excitation of 40 seconds at 100 N. For a double value of excitation (200 N) the same regulation of SP (100 N) is not perfectly optimal but nevertheless brought a very important reduction. These experiments with different levels of input force show the robustness of this method to mitigate vibrations.

Figure 4:
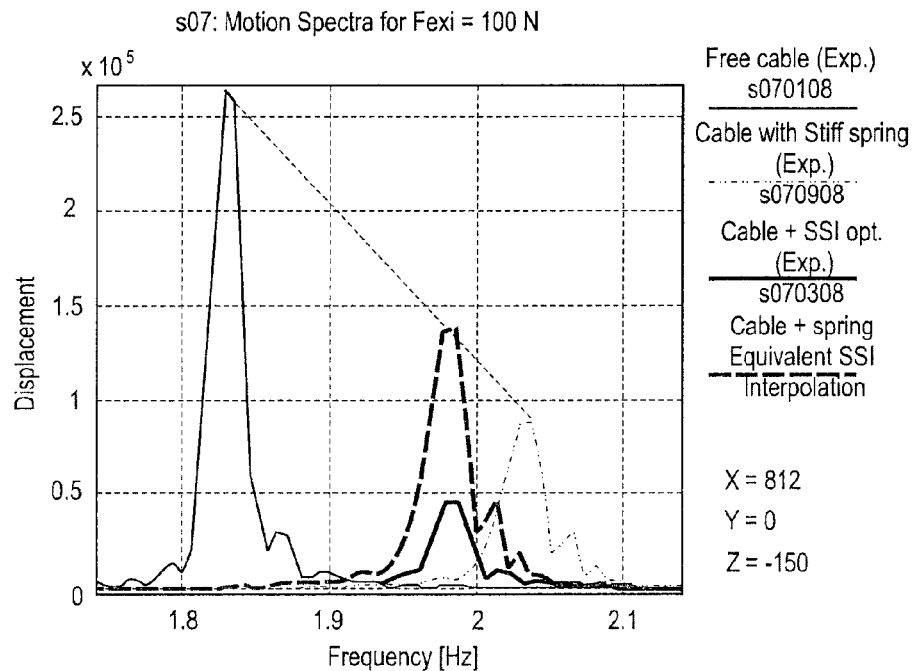
FIG. 4: shows the motion spectra of a cable equipped with a device according to the present invention (lowest peak, namely the curve identified as "Cable+SSI opt.", SSI device means a "state switch inducer" device) and the motion spectra of a cable equipped with the equivalent linear spring (dash line, namely the curve identified as "Cable+spring equivalent SSI").
Figure 5:
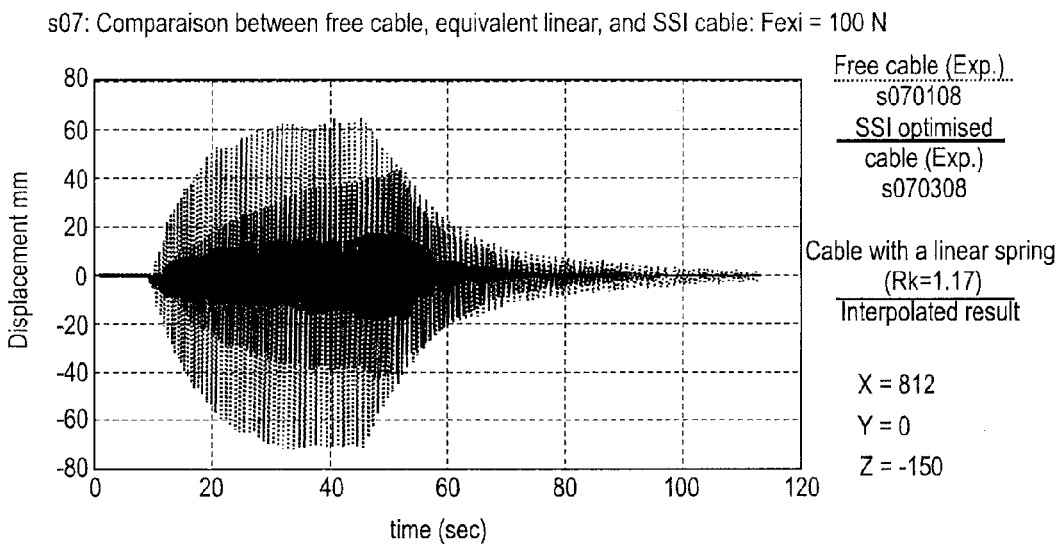
FIG. 5: shows the experimental motion curves of a cable equipped with a device according to the present invention (curve identified as "SSI optimised cable") and a free cable which is not equipped with a device (curve identified as "free cable").
Figure 6:
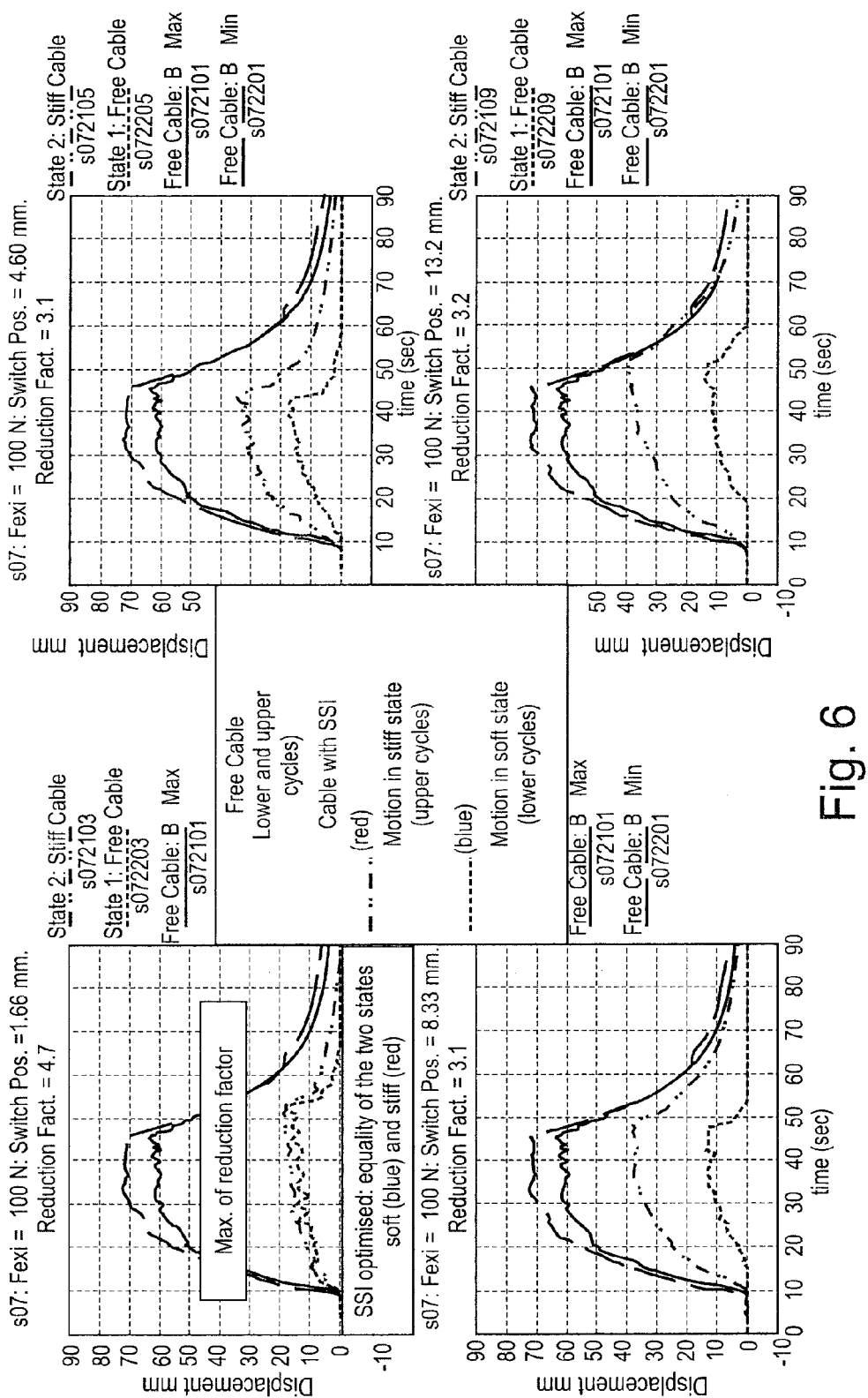
FIG. 6: shows the evolution of the reduction factor with respect the switch position (4 cases) and for 2 input levels.
Figure 6:
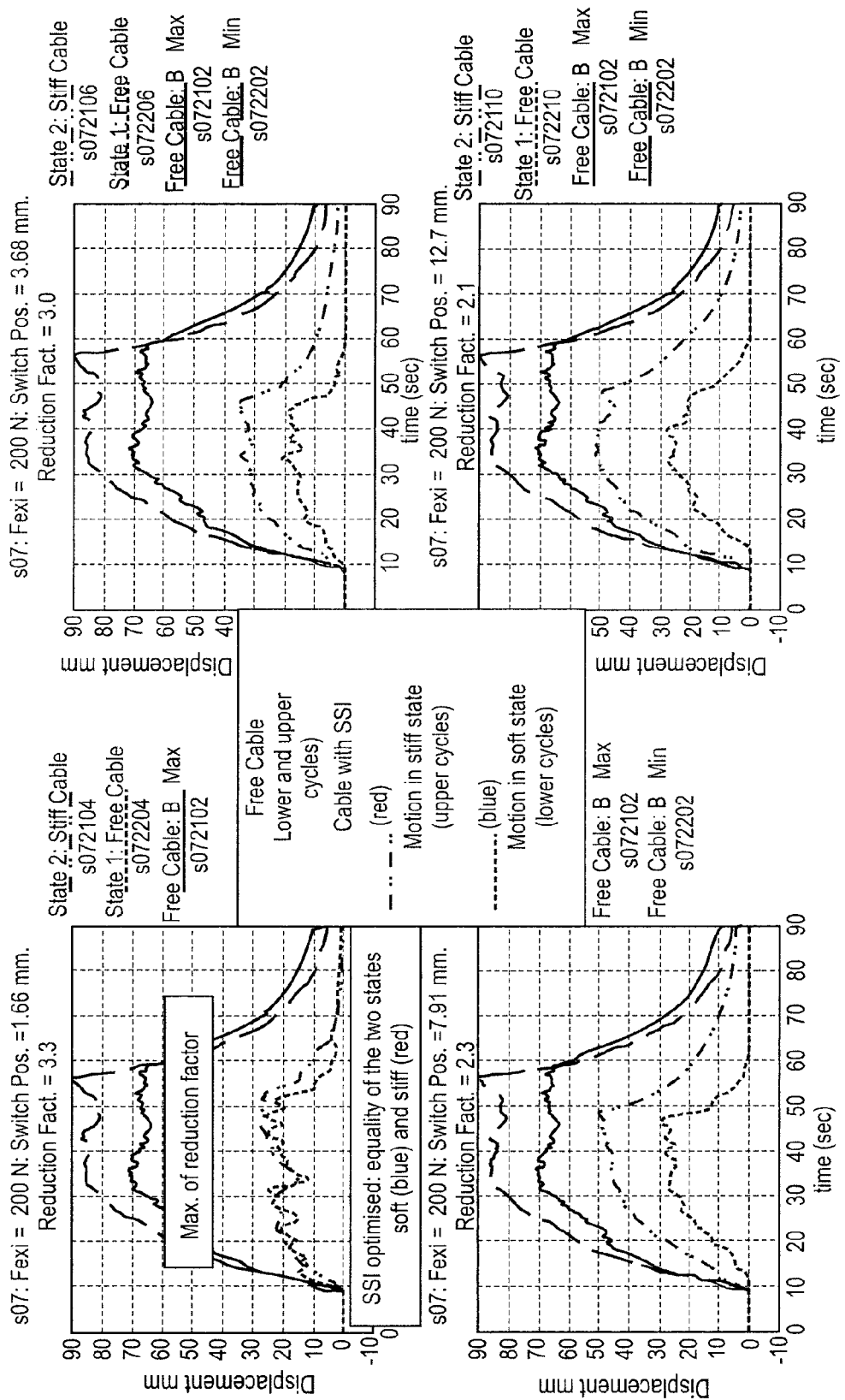

A cable equipped with a device according to the present invention (SSI (state switch inducer) cable) becomes a non-linear structure, characterized by the frequency value of the highest resonant mode Fbr most often called the bilinear frequency. To compare the motion of the cable equipped with a device according to the present invention (SSI cable) with the equivalent linear cable we must add permanently a spring to the free cable which becomes a cable slightly more stiff than the free cable but always with a linear behaviour, which has a frequency value of the resonant mode Fr equal to Fbr. We called it the equivalent SSI linear cable. It is the motion of this cable which is shown on the FIG. 5 as the last one in the legend, and in dash line on FIG. 4 for the spectra comparison. In FIG. 5 it can be verified on the experimental curves that, during the excitation phase, the motion reduction is more than three for the device according the present invention optimized at this level of excitation. The comparison with a linear spring added to the cable shows by interpolation that the motion reduction due to the device according to the present invention is of more than two. The experimental envelops of the cable displacements in FIG. 6 show the existence of the two dynamic states during the oscillations of the cable when the device according to the present invention is working. The identification of the two states (free cable and stiff cable) is obtained by measuring the force in the spring during the tests. The results clearly illustrate the formulation of the switch position defined by equation. (1): $SP(A_{opt})=A_{opt}(1-2/(1+R_k))$, which states that the amplitude of the oscillations is minimum when the motion in state 1 equal the motion in state 2.

Figure 7:
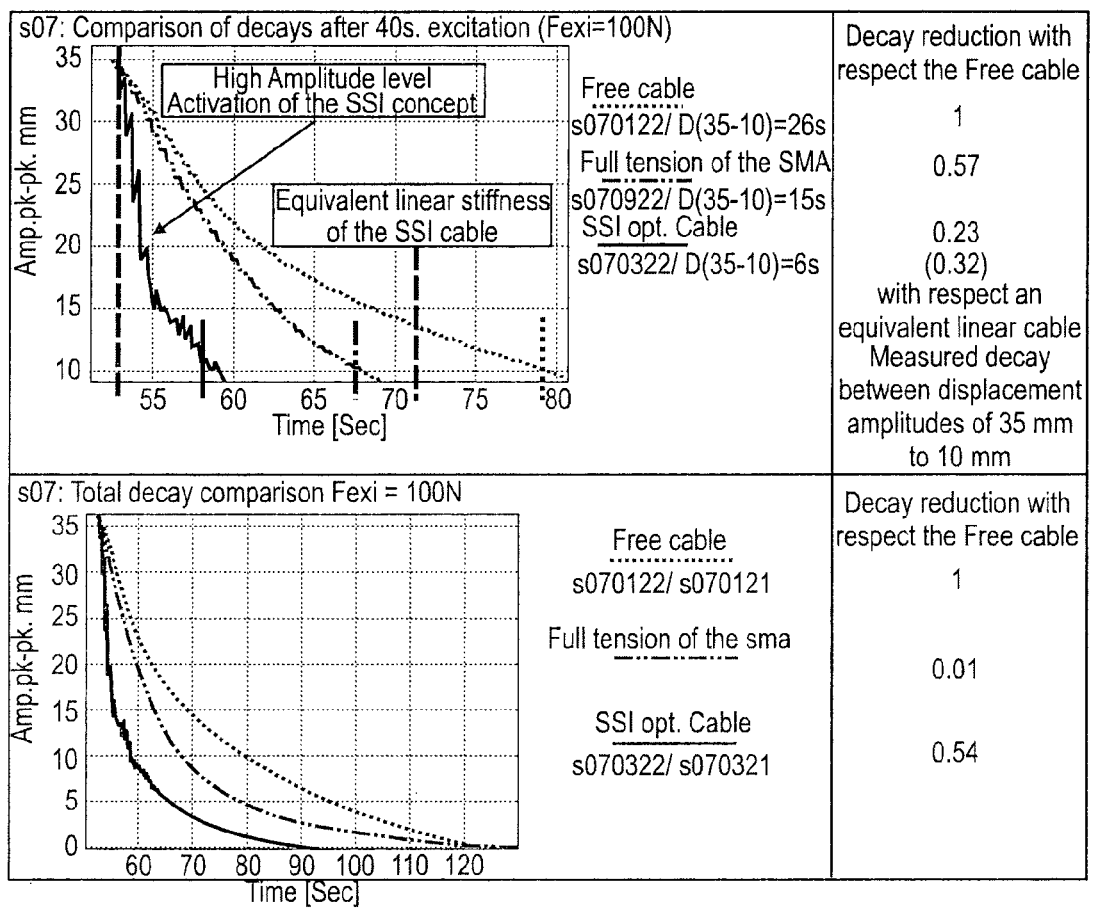
FIG. 7: shows the decay comparison for long period of excitation and for displacement transducer at L/6. The first graphic shows the case of high amplitude, where the device is efficient and the second graphic shows the total decay of the motion.

During the decay motion the period of oscillation is shorten of a factor superior to three compared to a cable without device or compared to an equivalent linear cable. The damping ratio is multiplied by a factor of three compared to a cable without device or compared to an equivalent linear cable (FIG. 7). Three kinds of experimental decay are illustrated which correspond to real excitation on cables. —Long excitation (>30 sec. or ~60 cycles) at the resonance of the cable, then decay—Short excitation (<5 sec or 10 cycles) at the resonance of the cable, then decay. —Records of the decay after the release of the same mass (70 Kg) for all the tests (or cable configuration) which corresponds to an excitation of all the modes but at very small amplitude. The results of the cable equipped with the device according to the present invention correspond to the lower curves on FIG. 7.

Long Excitation of the Cable:

The amplitude level reached by the cable is much smaller than the free cable amplitude then the comparison can be done only when both amplitude are equal (in that case 35 mm) (FIG. 7).

At the distance measured by the transducer (near L/6) all the main modes are present in the signal. The decay is then a representation of the apparent damping of all the modes together, in particular for the case of the cable with the device according to the present invention, where the proportion of higher modes is increased.

Short Excitation of the Cable:

The decay is here measured at middle span of the cable to show that the decay is present everywhere on the cable. In that case we obtain mainly the apparent damping of the first mode only. After a short time of excitation: 10 cycles at the first resonance frequency of each system the results are the following (FIG. 7).

Figure 8:
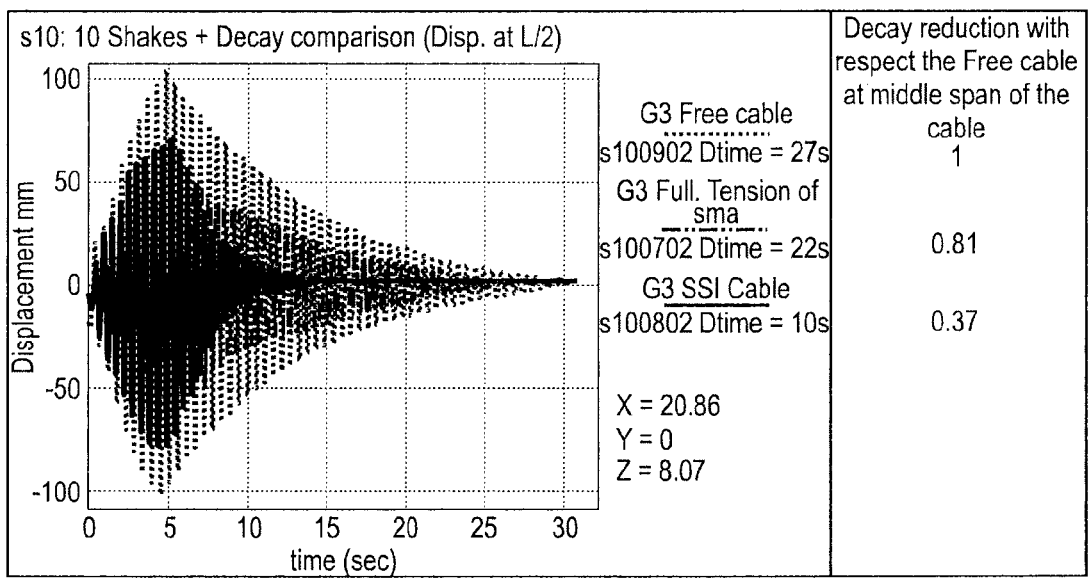
FIG. 8: shows the decay comparison for short period of excitation and for displacement transducer at L/2 for the total decay of the motion.
Figure 9:
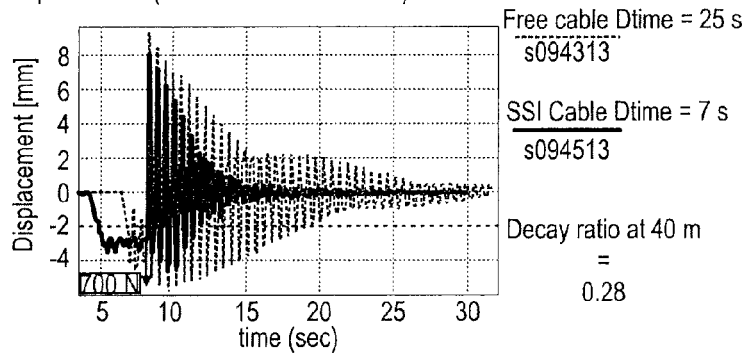
FIG. 9: shows an example of decay comparison for a release of a mass of 70 kg at 10 meters of the anchorage and for displacement at 40 m (first graphic) and 22.5 m (second graphic) from the anchorage.
Figure 9:
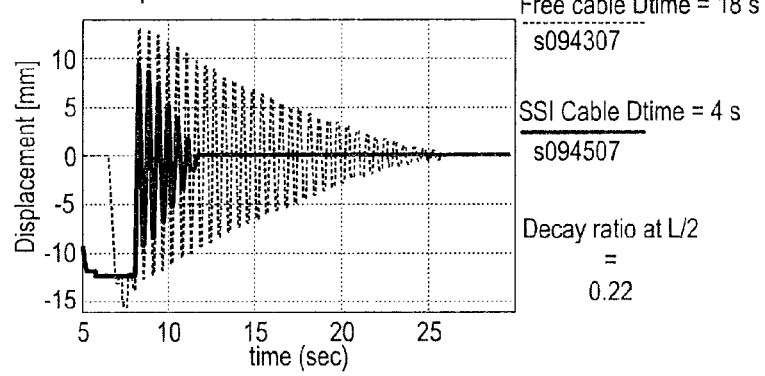

Release of a Mass (70 Kg). Test of Decay at Very Small Displacement of the Cable:

The load was mounted at a distance of 10 meters from the anchorage and the displacements were measured in different points of the cable (8, 22.5, 33, 40 m) to detect eventual irregularity of the motion along the cable. Different types of transducers were also used to avoid error due to the frequency range and principle of measurement: (Tronix, wire transducer, large displacement). (Gefran, Potentiometric transducer, small displacement). The results shown in FIG. 9 compare the decay motion of the free cable (corresponding to the curve identified as "free cable" on the graph, namely the first one mentioned in the legend) with the cable equipped with the device according to the present invention (identified as "SSI cable" curve on the graph, namely the second one mentioned in the legend). It can be seen from the FIGS. 7, 8 and 9 that in all the cases of different excitations or amplitudes levels and for all the positions measured on the cable the reduction of the time of the oscillations between a free cable and a cable with a device according to the present invention is of 85% (FIG. 7 ratio=0.54) in the worst case which means for the total length of the decay, because for small amplitudes the device according to the present invention is only partially active or not at all. The time of decay could decrease of 334% if we consider a reduction between the amplitude maximum of the cable with the device according to the present invention to ⅓ of this amplitude (33 mm to 10 mm), because in that case the device according to the present invention is optimized to large amplitude. This un-linearity in the decay reduction is another benefit of the device according to the present invention compared to other types of damping device as it conducts the cable very quickly at small level of amplitude which is acceptable for the designer.

Effect of the Device According to the Present Invention on the Damping Ratio:

The damping of the oscillations of a cable could be measured by different methods. The most common one is to process the data in the frequency domain and to use one of the different extraction methods (*) to obtain the frequencies, damping and mode shapes of the cable when it exhibits sinusoidal motion, which is the case of the free cable or the full tensioned cable by the spring permanently attached. ((*) Author of one of these methods in: Tirelli D. "Modal Analysis of Small and Medium Structures by Fast Impact Hammer Testing (FIHT) Method." EUR 24964 EN. Luxembourg (Luxembourg): Publications Office of the European Union; 2011. JRC66055.)

Figure 10:
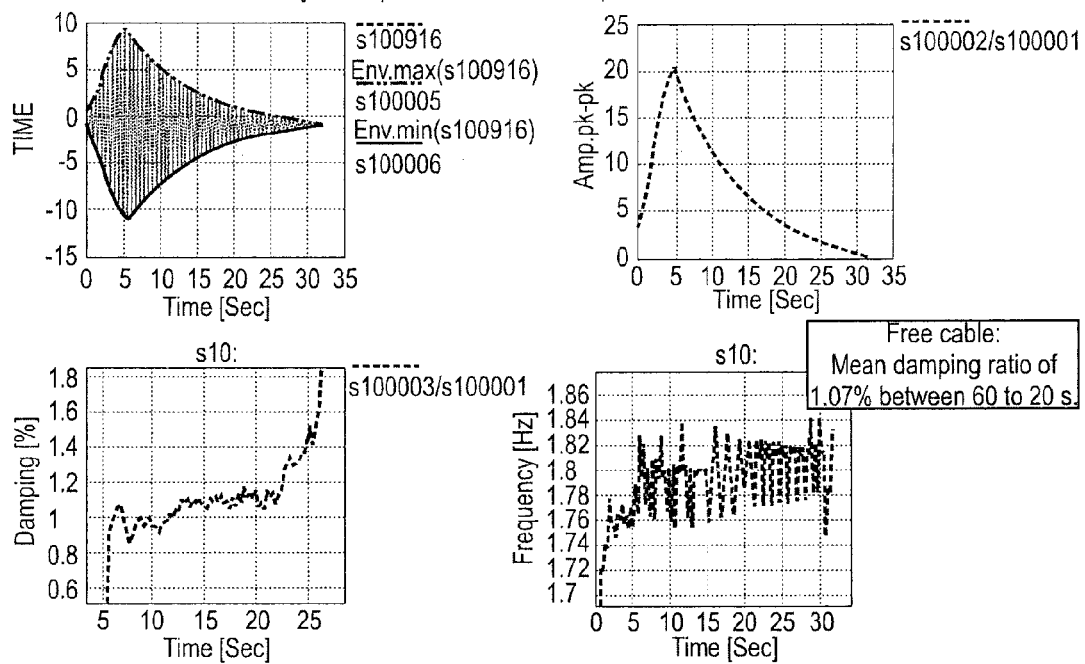
FIG. 10: shows amplitude, damping and frequency evolution for a free cable which is not equipped with a device according to the present invention.
Figure 11:
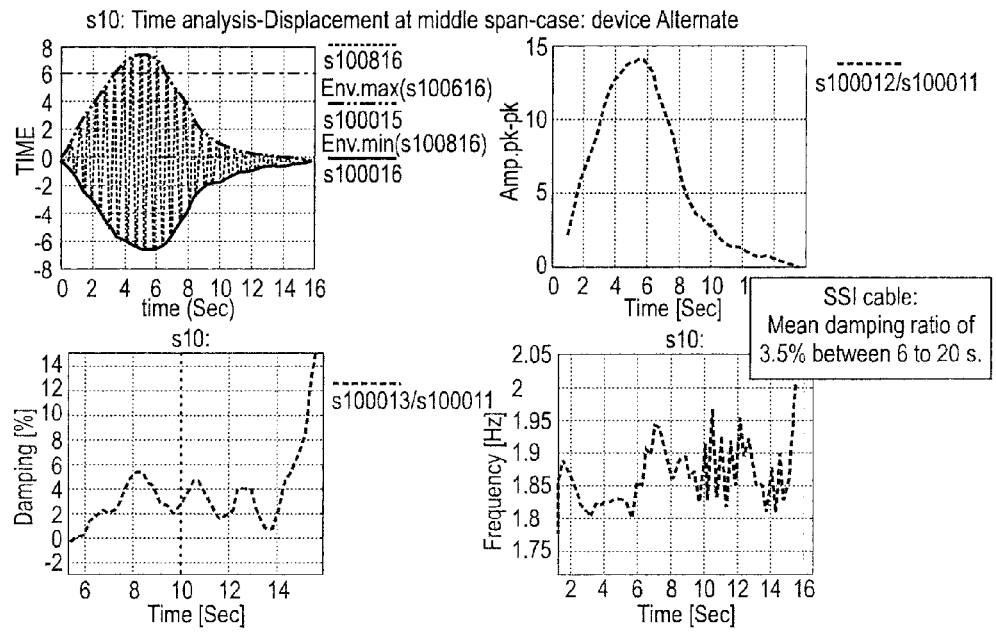
FIG. 11: shows amplitude, damping and frequency evolution for a cable which is equipped with a device according to the present invention.

It is no longer the case when the cable is equipped with a device according to the present invention. The motion is always close to sinusoidal but not perfectly. It is not a linear but a bilinear structure. However, the spectra obtained could be assumed to represent a closed behaviour of the real one, but it gives a mean value of the damping and of the frequencies. To obtain a value of the damping during all the time of the experiment other methods should be applied as the wavelet decomposition, or the Fractionned Logaritmic Decrement (FLD) developed at this aim during this project. This last method as it is shown in FIGS. 10 and 11 allows seeing the evolution of the damping during all the decay time, using a supplementary signal to process the data which is the force in the device during the test. With the force signal, all the switch events are measured allowing knowing in which state (free or attached) the cable belongs. The results obtained with this method are then rigorous until the motion is periodic, because the processing is done in each of the state of the cable. In FIGS. 10 and 11, the evolution of the frequency and damping are shown for the example of the cable 1 of Ispra, after a short period of excitation. The mean damping increment is of about 3.5/1.07=3.2. The device according to the present invention brings an increment of 320% on the damping ratio for medium oscillations.

Figure 12:
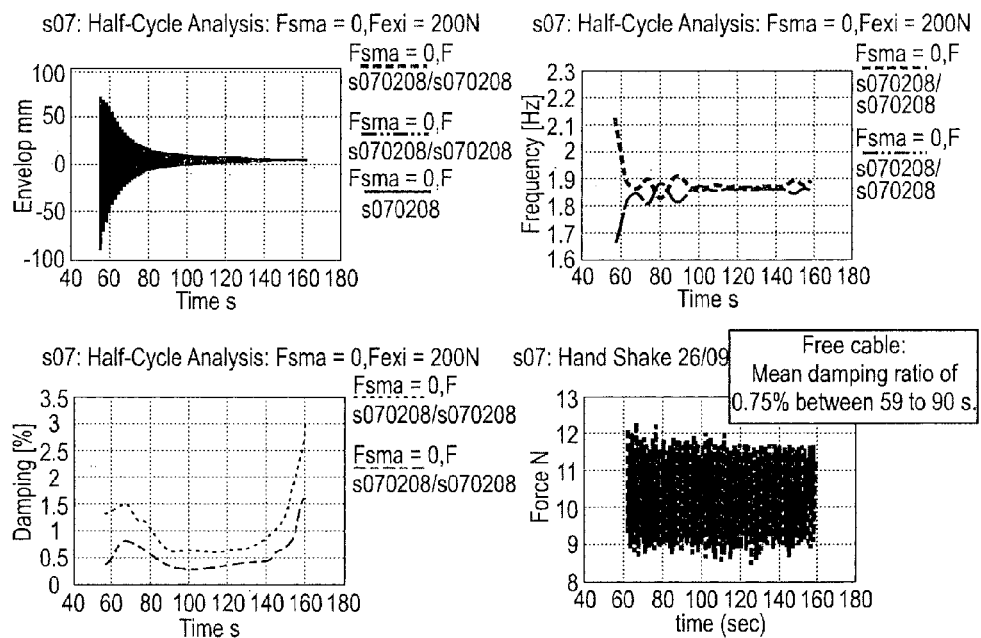
FIG. 12: shows frequency, damping and force evolution during a large excitation of the cable which is not equipped with a device according to the present invention.
Figure 13:
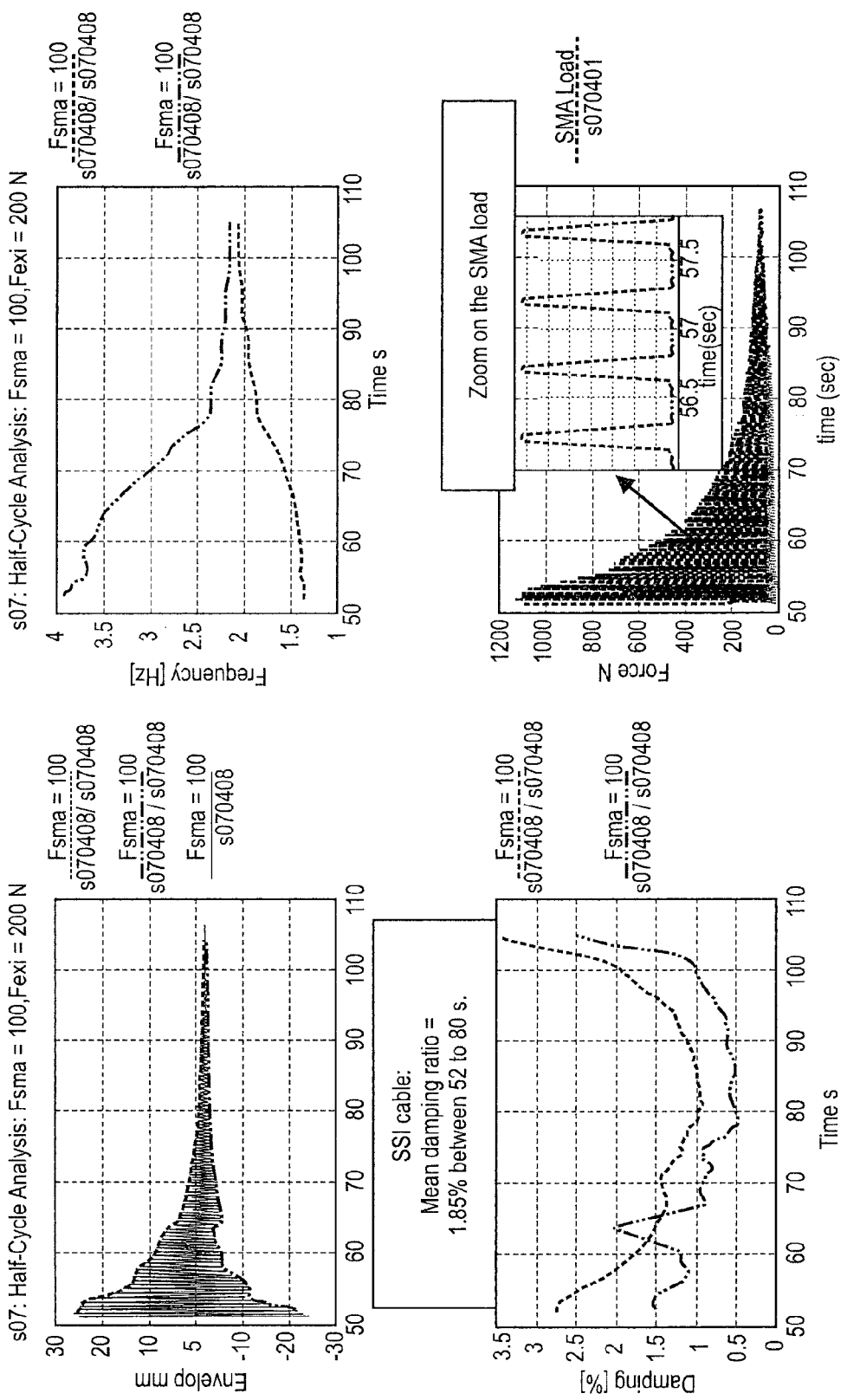
FIG. 13: shows frequency, damping and force evolution during a large excitation of the cable which is equipped with a device according to the present invention.

In the curves shown in FIGS. 12 and 13, the FLD method for the damping evolution is used for large displacements of the cable after a long and strong excitation (200 N). It can be seen that the evolution is made for the two states of the cable in different curves. The curve identified with the dotted line corresponds to the one of the free cable (namely the first curve identified within the legend) and the curve identified with the dash line corresponds to the one of the attached cable (namely the second curve identified within the legend). When the cable is free the analysis is performed in the same state but for positive and negative cycles. The force signal is noise (zero) as the device is not attached.

Figure 14:
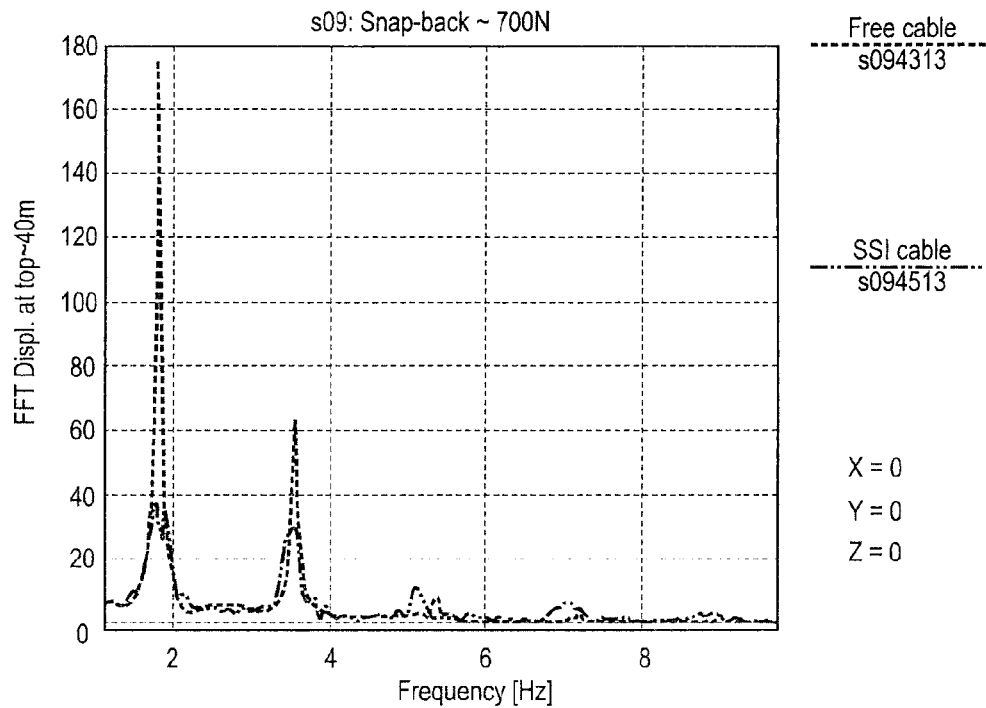
FIG. 14: shows a spectra comparison between a cable equipped with a device according to the present invention and a free cable which does not comprise any device.

It is interesting to see in FIG. 12 that it is only when the device according to the present invention is optimized that the damping increases (before 70 sec) and during this period the frequency of the 2 states (free cable and attached cable) are very different. After that period the system become linear with one frequency and a low damping ratio. Globally the damping ratio for large displacement increases of a factor 2.57 (237%) between a free cable decay and a cable equipped with a device according to the present invention. In FIG. 14, the comparison of the Fourier spectra of the free cable and the cable equipped with a device according to the present invention (SSI cable) is shown for a snap back test (release). It is very clear that the peaks are flatter. Recording that the thickness of the peaks represents the damping, the increase of this damping can be observed in all the modes (because they are coupled).

The device according to the present invention is applicable to all types and for any mode number which is growing to resonance, as its concept is based on the predominant displacement governing the vibration motion. The chaos theory shows that when the input or output amplitude becomes higher than a given level, the Bilinear Oscillator changes its attractor, and in that case the vibration jumps to a higher mode number. In that way, the stability of the system is ensured; as the energy needed, to join the same motion, is higher.

Figure 15:
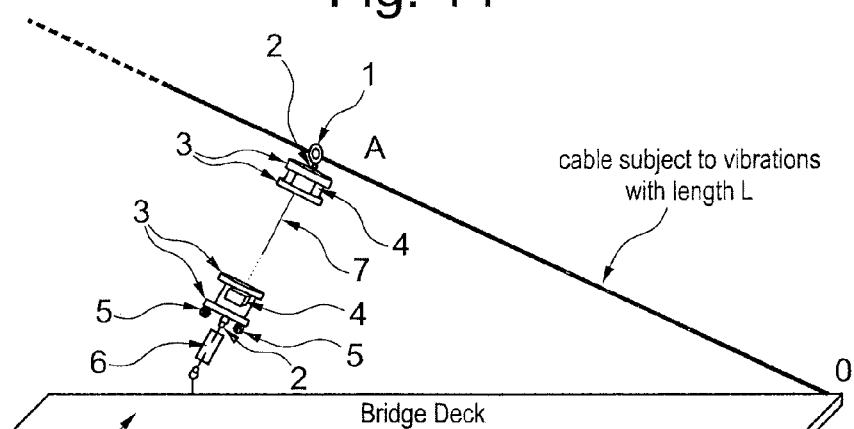
FIG. 15: shows a possible embodiment of a device according to the present invention.

Example of a Possible Embodiment of the Device According to the Present Invention FIG. 15 shows a possible embodiment of a device according to the present invention. FIG. 15 shows a device design which could be installed on a taut cable submitted to vibration problems. The passive device is perpendicularly attached to the taut cable. As it is shown the angle formed by the intersection of the device and the taut cable is about 90 degrees. The action of the device occurs when the taut cable exceeds the switch position. The device according to the present invention is attached to the taut cable through a steel crown (1) and a forged steel eyebolt (2). The device also comprises a thin wire of Nitinol (7) which is framed between respectively 2 screws comprising two steel disks (3) and a cubic steel piece for Nitinol wire attachment (4). One of the screws is connected to the taut cable (superior screw) whereas the other one (inferior screw) is linked to the bridge deck. The inferior screw is connected to the bridge deck through a forged eyebolt (2) connected to screw tendons (6). At last, the screw tendons (6) is connected to the bridge deck through long steel bolts (5).

The invention claimed is:

1. A passive method for protecting taut cables from vibrations comprising a perpendicularly attachment of a device comprising a unilateral spring or a shape memory alloy wire to a taut cable at an attachment position characterized in that the device acts on the taut cable when the taut cable is submitted to vibrations causing a motion of the taut cable to exceed a switch position (SP) which is determined by the following equation, equation (1):

$$SP(A\text{opt}) = A\text{opt}(1 - 2/(1 + Rk))$$

wherein:

Aopt is the amplitude reached by the taut cable with the device optimized at a switch position SP(Aopt), $R_k$ is the dynamic stiffness ratio between the taut cable with the device ($k_{ssi}$) and the taut cable without the device ($k_c$) and can be determined by measuring the resonance frequency of the cable alone $f_{(c)(i)}$ and the frequency $f_{(c+s)(i)}$ of the cable connected permanently to the device, $R_k$ is defined by either the following equation, equation (2):

$$R_k = \left(\frac{f_{(c+s)(i)}}{f_{(c)(i)}}\right)^2,$$

or or by the following equation, equation (3):

$$R_k = 1 + \frac{k_s \cdot \sin(i \cdot \pi \cdot ap/L)^2}{k_{(c)(i)}},$$

with $k_s$ is the stiffness of the unilateral spring or the stiffness of the shape memory alloy wire in the elastic phase, i corresponds to a resonant mode number, L is the cable length, ap is the attachment position of the device, and $k_{(c)(i)}$ is the stiffness of the cable for resonant mode i.

2. The method according to claim 1 wherein the attachment position of the device to the taut cable is comprised within the range of 0.05 xL and 0.25 xL, wherein L represents the length of the taut cable.

3. The method according to claim 1 wherein the attachment position of the device is comprised within the range of 0.10 xL and 0.20 xL, wherein L represents the length of the taut cable.

4. The method according to claim 1 wherein the attachment position of the device is 0.15 xL, wherein L represents the length of the taut cable.

5. The method according to claim 1 wherein the attachment position of the device to the taut cable is located in the plane of the vibrations to be mitigated.

6. The method according to claim 1 wherein, when the device comprises the shape memory alloy wire, a shape memory alloy being a metal alloy of Nickel and Titanium.

7. The method according to claim 6 wherein Nickel and Titanium are present in equal atomic percentages in the metal alloy.

8. A device for protecting a taut cable of a construction from vibrations comprising a unilateral spring or a shape memory alloy wire which is perpendicularly attached to said taut cable and which acts on the taut cable when the taut cable is submitted to vibrations causing a motion of the taut cable to exceed a switch position (SP) which is determined by the following equation, equation (1):

$$SP(A\text{opt}) = A\text{opt}(1 - 2/(1 + Rk))$$

wherein:

Aopt is the amplitude reached by the taut cable with the device optimized at a switch position SP(Aopt), $R_k$ is the dynamic stiffness ratio between the taut cable with the device ($k_{ssi}$) and the taut cable without the device ($k_c$) and can be determined by measuring the resonance frequency of the cable alone $f_{(c)(i)}$ and the frequency $f_{(c+s)(i)}$ of the cable connected permanently to the device $R_k$ is defined by either the following equation, equation (2):

$$R_k = \left(\frac{f_{(c+s)(i)}}{f_{(c)(i)}}\right)^2,$$

or or by the following equation, equation (3):

$$R_k = 1 + \frac{k_s \cdot \sin(i \cdot \pi \cdot ap/L)^2}{k_{(c)(i)}},$$

with $k_s$ being the stiffness of the unilateral spring or the stiffness of the shape memory alloy wire in the elastic phase, i corresponds to a resonant mode number, L is the cable length, ap is the attachment position of the device, and $k_{(c)(i)}$ is the stiffness of the cable for resonant mode i.

9. The device according to claim 8 wherein the device further comprises the unilateral spring and two stirrups which are connected to each extremity of the unilateral spring, a first stirrup is an inferior stirrup and is connected to the construction or to the ground, and a second stirrup is a superior stirrup and is connected to the taut cable.

10. The device according to claim 9 wherein the superior stirrup is connected to the taut cable through a rigid fixation device.

11. The device according to claim 8 wherein it further comprises a screw arrangement for gap regulation.

12. The device according to claim 9 wherein the inferior stirrup is connected to the ground or the construction through a screw arrangement for gap regulation.

13. The device according to claim 8 wherein the device comprises the shape memory alloy wire, a shape memory alloy being a metal alloy of Nickel and Titanium.

14. The device according to claim 13 wherein Nickel and Titanium are present in equal atomic percentages in the metal alloy.

15. The device according to claim 8 for protecting taut cables from vibrations.

* * * * *